United States Patent [19]

Dreinhoff et al.

[11] Patent Number: 4,868,583
[45] Date of Patent: Sep. 19, 1989

[54] METHOD FOR FASHIONING INK CHANNELS IN A WRITE HEAD FOR A DOT-MATRIX INK PRINTER MEANS

[75] Inventors: Karl H. Dreinhoff; Harald Schulz, both of Berlin, Fed. Rep. of Germany

[73] Assignee: Siemens Aktiengesellschaft, Berlin and Munich, Fed. Rep. of Germany

[21] Appl. No.: 230,426

[22] Filed: Aug. 10, 1988

[30] Foreign Application Priority Data

Aug. 28, 1987 [DE] Fed. Rep. of Germany ....... 3729205

[51] Int. Cl.[4] ........................................... G01D 15/16
[52] U.S. Cl. ................................. 346/1.1; 346/140 R; 264/130; 264/334
[58] Field of Search ................. 346/140, 1.1; 264/156, 264/154, 130, 334, 262

[56] References Cited

U.S. PATENT DOCUMENTS

| 4,095,238 | 6/1978 | Kattner | 346/140 |
| 4,158,847 | 6/1979 | Heinzl | 346/140 |
| 4,248,823 | 2/1981 | Bader et al. | 264/334 X |

FOREIGN PATENT DOCUMENTS

| 0042932 | 1/1982 | European Pat. Off. |
| 103841 | 3/1984 | European Pat. Off. |
| 0145880 | 6/1985 | European Pat. Off. |
| 2543420 | 3/1977 | Fed. Rep. of Germany |
| 2543451 | 3/1977 | Fed. Rep. of Germany |
| 55-71572 | 5/1980 | Japan |
| 1167690 | 10/1969 | United Kingdom |

Primary Examiner—Joseph W. Hartary
Attorney, Agent, or Firm—Hill, Van Santen, Steadman & Simpson

[57] ABSTRACT

A method for fashioning ink channels in a write head for a dot-matrix ink printer means, whereby form needles respectively coated by parting agent and cylindrically surrounded by piezo electric drive elements are aligned in a casting mold in accord with the desired course of the ink channels to be fashioned, are cast out with a casting compound and, after the curing of the latter, are removed upon formation of the respective ink channels partially surrounded by the allocated piezo electric drive elements, and isolation of the drive elements from a writing fluid in the ink channels is achieved in a way that is simple in terms of production engineering. An envelope coat is applied to the form needles coated with parting agent, being applied thereto before they are introduced into the casting mold, this envelope layer forming the inside channel wall of the appertaining ink channel after the removal of the form needles and of the parting agent. The new method serves the purpose of manufacturing ink printer heads that work based on the principle of individual drop ejection (drop on demand).

6 Claims, 2 Drawing Sheets

METHOD FOR FASHIONING INK CHANNELS IN A WRITE HEAD FOR A DOT-MATRIX INK PRINTER MEANS

BACKGROUND OF THE INVENTION

The invention is directed to a method for fashioning ink channels in write head for a dot-matrix ink printer means wherein form needles coated with a parting agent and cylindrically surrounded by piezo electric drive elements are aligned in a casting mold in accord with the desired course of the ink channels to be fashioned, are cast out with a casting compound and are removed after the curing of the casting compound upon formation of the respective ink channels partially surrounded by the allocated piezo electric drive elements.

Known write heads for dot-matrix ink printer means (see German Pat. No. 25 43 451) that work based on the principle of individual drop ejection (drop on demand) contain individually drivable tubes of piezo ceramic material as drive elements for the ejection of ink drops from ink channels, each of these tubes of piezo ceramic material respectively surrounding an ink channel proceeding in the inside of the write head, surrounding the latter over a part of its length. Upon selection or drive of one of the drive elements, this tube of piezo ceramic material constricts, whereby an ink drop is ejected from the allocated ink channel.

For constructing such a write head, German Pat. No. 25 43 451 discloses that the drive elements be plugged onto form needles and the needles be aligned in a casting mold in accord with the desired course of the ink channels; subsequently, the casting mold is filled out with a casting compound and the form needles are removed after the casting compound has cured. In order to prevent the drive elements from coming into direct contact with the writing fluid in the ink channels, which can lead to the penetration of the writing fluid into the porous ceramic of the drive elements and to shorts resulting therefrom, small protective tube of metal are plugged into the drive elements before they are cast out and are drawn onto the form needles together with the drive elements, so that the small protective tubes in the finished write head isolate the drive elements that surround them from the interior of the allocated ink channels, which can lead to the penetration of the writing fluid into the porous ceramic of the drive elements and to shorts resulting therefrom, small protective tubes of metal are plugged into the drive elements before they are csat out and are drawn onto the form needles together with the drive elements, so that the small protective tubes in the finished write head isolate the drive elements that surround them from the interior of the allocated ink channels. The relatively thick wall thickness of the small protective tubes required in view of the inherent stability of the small protective tubes, however, requires a relatively high selection energy for the drive elements. Further, the relatively thick wall thickness of the small protective tubes complicates the fan-in of the ink channels to form a tight channel exit grid (nozzle grid), particularly when the drive elements should be arranged as close as possible to the channel discharges of the ink channels. Finally, casting compound can penetrate in undefined fashion into a gap between the form needles and the apperatining drive element and can form a rough inside wall of the channels after the removal of the form needle. The analogous case is true of a further modification of the method disclosed by German Published Application No. 25 43 420 wherein the drive elements are each coated with an insulating layer before they are arranged on the form needles.

In a modified method likewise disclosed by German Published Application No. 25 43 420 for fashioning the ink channels in the write head, the drive elements are plugged onto the appertaining form needles upon interposition of a respective wire helix, so that the casting compound penetrates into the interspaces between the drive elements and the appertaining form needles in the subsequent casting and thus forms a protective layer isolating the appertaining drive element from the inside of the channel. However, the homogeneity of the protective layer is disturbed by the wire helix, so that it is not impossible that particles of the casting compound can crumble off when the form needles are removed or later when the drive elements are driven, namely due to the pressure pulses resulting therefrom.

SUMMARY OF THE INVENTION

An object of the invention is to isolate the drive elements from the writing fluid in the ink channels in a simple way in terms of production engineering upon formation of continuously smooth inside walls of the channels.

A significant advantage of the method of the invention is that, with the formation of the envelope layers on the form needles, smooth, ink-impermeable inside channel walls of the ink channels are created over the length of the ink channels to be formed but at least in the region of the drive elements because the envelope layers are not affected by the shrinkage of the casting compound when the latter cures. Regions of the curing casting compound loosened in the region of the inside channel walls due to shrinkage as can particularly occur given employment of wree helices for electrical contacting of the drive elements and for the centering thereof on the form needles are stablized in an advantageous way by the envelope layers. In that the envelope layers are applied onto the form needles, they require no inherent mechanical stability, contrasting with small protective tubes (CF., German Published Application No. 25 43 420), and therefore enable an unproblematical manipulation in manufacture, warehousing and assembly. The wall thickness of the envelope layers can therefore be kept extremely low so that a good pulse transmission from the driven elements onto the writing fluid in the ink channels is achieved given employment of drive elements having a correspondingly small tube apperture width. Over and above this, the method of the invention is particularly suited for the manufacture of curved ink channels as well.

A plastic layer is advantageoulsy applied as envelope layer, this plastic layer being resistant to the writing fluid and impermeable, being further moistened by the writing fluid and exhibiting good adhesion to the casting compound. To this end, the form needles coated with parting agent can, for example, be dipped into a plastic solution.

In accord with a modification of the method, a metal layer can be applied as envelope layer within the framework of the invention. The advantage of a metallic envelope layer is comprised in its employability as electrical connection for the drive elements and in the good mechanical pulse transmission behavior. Over and above this, it has been found that, due to the elasticity of the metallic envelope layer when the drive elements are driven, the casting compound that has penetrated between the drive elements and the envelope layer is merely subjected to pressure stresses, so that the casting compound is prevented from loosening in this region. The metallic envelope layer can be optionally rolled onto or electro-deposited onto the form needles. In the latter case, it is necessary to coat the layer of parting agent lying therebelow with a conductive layer or necessary to use a conductive parting agent.

In accord with an advantageous development of the method of the invention, an intermediate layer that is soluble in a rinse agent is applied to the parting layer before the application of the envelope layer and is rinsed out of the ink channels together with the parting agent afer the form needles are removed. Whereas the parting layer for example, a thermoplastic plastic having low strength, an inorganic material having low shearing strength or a metal alloy having a low melting point guarantees the ejectability of the form needles, the intermediate layer enables a residue-free cleaning of the inside channle walls after the removal of the form needles. For example, a solvent dissolving the intermediate layer or, given a water-soluble intermediate layer, simple water can be used as rinse agent.

In order the enable the arrangement of the channel discharge in a tight nozzle grid in the finished write head, it is necessary to tightly fan the form needles in with their tips. A development of the method of the invention provides in this context that the tips of the form needles forming the channel exit regions of the ink channels are left uncoated by the parting layer and by the envelope layer and that the end region of the parting layer is completely covered by the envelope layer. In that the tips of the form needles remain uncoated, they can be arranged in a tight nozzle grid. When the casting mold is cast out with the casting compound from flowing into a gap between the form needles and the envelope and the envelope layer that may possibly form due to melting of the parting layer.

In a modification of the method that likewise enables an arrangement of the channel exit regions in a tight nozzle grid, the tips of the form needles forming the channel exit regions of the ink channels are left uncoated by the parting layer and by the envelope layer and are coated by a second parting layer covering the end region of the envelope layer. The second parting layer is so thin that it enables a fan-in of the tips of the formed needles to form a tight nozzle grid. At the same time, the second parting layer guarantees an easy ejectability of the form needles and prevents a penetration of the casting compound into a gap between the envelope layer and the form needles that can form due to melting of the first parting layer.

BRIEF DESCRIPTION OF THE DRAWINGS

The figures of the drawing shall be referred to below for explaining the invention, shown in detail are.

DESCRIPTION OF THE PREFERRED EMBODIMENTS

Figure 1:
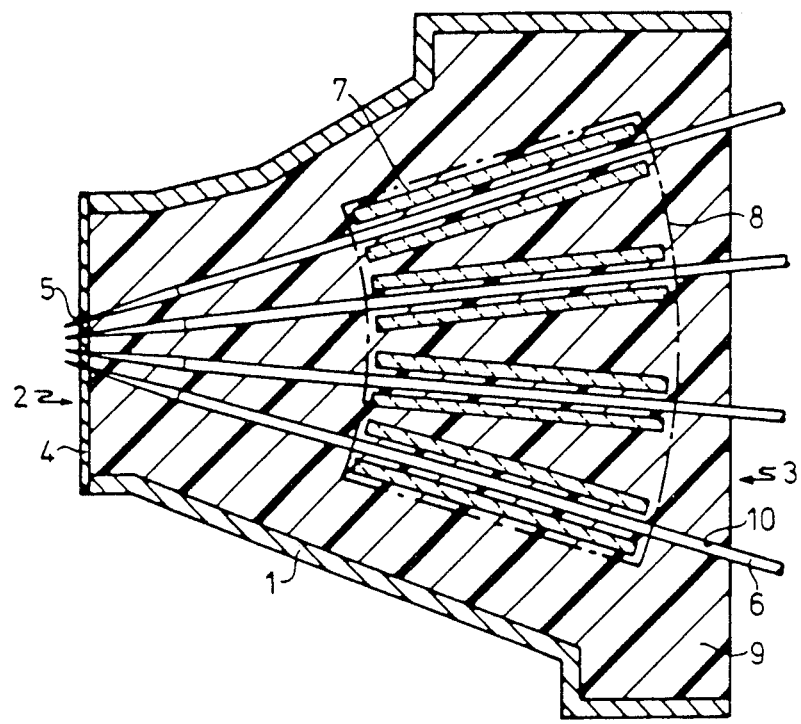
FIG. 1 is a casting mold comprising form needles positioned therein and drive elements carried by the latter for casting a write head for a dot-matric ink printer means.

FIG. 1 shows an essentially funnel-shaped casting mold 1 comprising two funnel openings 2 and 3 of which the smaller funnel opening 2 is terminated with a centering plate 4. The centering plate 4 contains bores 5 corresponding to the desired arrangement of the channel discharges (nozzle arrangement) in the write head to be manufactured. Drive elements 7 composed of tubular piezo ceramics are plugged onto individual form needles 6. The form needles have their tips centered in the bores 5 of the centering plate 4 and are aligned inside the casting mold 1 in accord with the desired position of the ink channels to be fashioned in the write head. It is also possible to combine the drive elements 7 in a mount to form an assembly 8 that is merely indicated here by a dot-dash boundary, to secure the assembly 8 in the casting mold 1, and to conduct the individual form needles through the openings of the drive elements 7 into the bores 5 of the centering plate 4. Subsequently, the casting mold is filled with a casting compound (preferably casting resin) proceeding from its large funnel opening 3. After the casting compound has cured to form a cast member 9, the form needles 6 are withdrawn from the cast member 9, so that ink channels 10 therein remain surrounded by one of the drive elements 7 over a part of their length.

In order to be able to easily remove the form needles 6 after the casting-out of the casting mold 1 and in order to thereby obtain smooth, crack-free inside channel walls of the ink channels 10 that are resistant to writing fluid, the form needles 6, corresponding to the illustrations in FIGS. 2 through 5, are first coated with a parting agent layer 11 and are subsequently coated with an envelope layer 12 before they are plugged into the drive element 7 and before they are introduced into the casting mold 1. FIGS. 2 through 5 show this with reference to the example of a form needle 6 treated in this way that has its tip held in a bore 5 of the centering plate 4.

Figure 2:
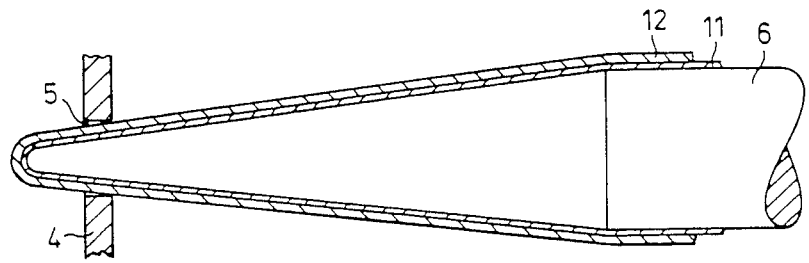
FIGS. 2-5 are form needles respectively differently coated, being shown in the region of their tips.

As FIG. 2 shows, the form needles 6 can be respectively completely coated with the parting agent layer 11 and with the envelope layer 12 lying thereon. To that end, the needles are completely coatdd with a parting layer 11 of wax that, for exampe, is 0.5 um thick, being coated therewith at least over that length coming into contact with the casting compound. Following thereupon, the form needles are coated with a thermoplastic layer as envelope layer 12 having roughly the same thickness, being coated therewith by being dipped into a plastic solution. After the casting-out with the casting compound and after the curing thereof, the form needles are ejected at a temperature of the cast member 9 whereat the parting layer 11 exhibits an extremely low shearing strength. The low strength of the wax thereby also allows a damage-free unmolding even at room temperature. However, it is possible to apply an inorganic material having low shearing strength such as, for examle, $MoS_2$ or a metal alloy having a lower melting point as parting layer 11 instead of a wax. It is likewise possible to manufacture the envelope layer 12 of metal in that it is rolled onto or electro-deposited onto the form needles 6 coated with parting agent. The envelope layers 12 remaining as inside channel walls in the cast member 9 after unmolding of the form neendles 6 are subsequently cleaned of residues of the parting layer 11.

Figure 3:
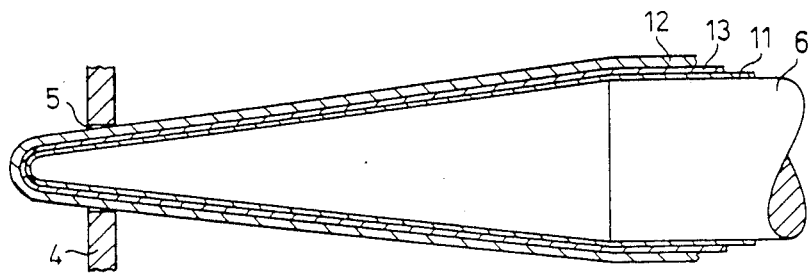

In accord with the illustration in FIG. 3, the cleaning of the ink channels 10 can be improved in that a rinse-soluble intermediate layer 13 is applied onto the parting layer 11 before the application of the envelope layer 12. The intermediate layer 13 can be optionally water soluble, whereby hot water having an additive is employed, for example, as rinse agent or can be composed of a plastic that can be removed with a solvent. The ejectability of the form needles 6 is thereby guaranteed by the parting layer 11, whereas the intermediate layer 13 facilitates the residue-free cleaning of the ink channels 10.

Figure 4:
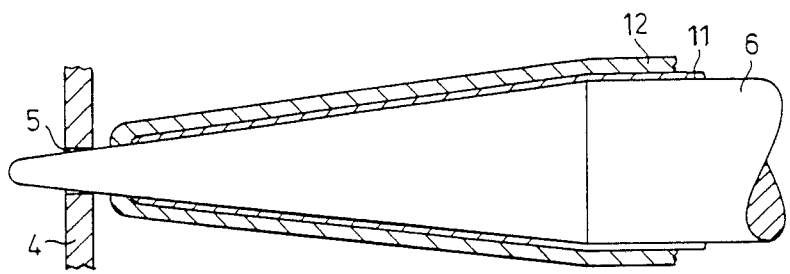
Figure 5:
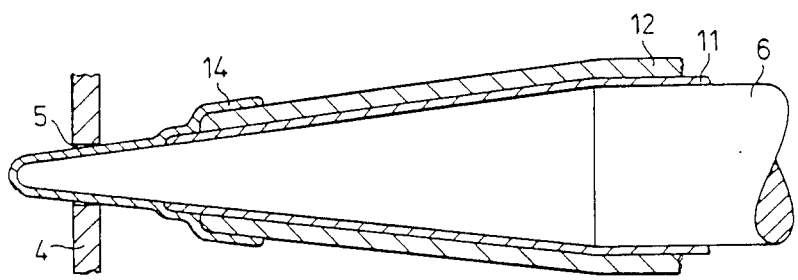

As FIGS. 4 and 5 show, especially small channel discharge openings of the ink channels 10 can be produced in an extremely tight nozzle grid in that the tips of the form needles forming the channel discharge regions of the ink channels 10 are left uncoated by the parting layer 11 and by the envelope layer 12. In the example shown in FIG. 4, the envelope layer 12 thereby completely covers the end region of the parting layer 11, so that no casting resin can flow into a gap formed between the envelope layer 12 and the form needles 6 due to melting of the parting layer 11 when the casting mold 1 is cast out with the casting compound. In the example shown in FIG. 5, this is prevented in that the tips of the form needles 6 are coated with a second parting layer 14 covering the end region of the envelope layer 12, this second parting layer 14, due to its thinness, having only an insignificant influence on the fineness of the nozzle grid to be produced with the channel discharge regions.

As is apparent from the foregoing specification, the invention is susceptible of being embodied with various alterations and modifications which may differ particularly from those that have been described in the peeceding specification and description. It should be understood that I wish to embody within the scope of the patent warranted hereon all such modifications as reasonably and properly come within the scope of my contribution to the art.

I claim as my invention:

1. A method for fashioning ink channels in a write head for a dot-matrix ink printer means, whereby form needles respectively coated with a parting agent and cylindrically surrounded by piezo electric drive elements are aligned in a casting mold in accord with the desired course of the ink channels to be formed, are cast out with a casting compound and, after the curing of the latter, are removed upon formation of the ink channel respectively partially surrounded by the allocated, piezo electric drive elements comprises the steps of applying an envelope layer to the form needles coated with parting agent, said application occurring before introduction of said form needles into the casting mold and subsequent removal of said form needles and parting agent, said envelope layer forming the inside channel wall of the appertaining ink channel after the removal of the form needles and of the parting agent.

2. A method according to claim 1, wherein a plastic layer is applied as envelope layer.

3. A method according to claim 1, wherein a metal layer is applied as envelope layer.

4. A method according to claim 1, wherein an intermediate layer that is soluble in rinse agent is applied to the parting layer before the application of the envelope layer, said intermediate layer being rinsed out of the ink channels together with the parting agent after the removal of the form needles.

5. A method according to claim 1, wherein the tips of the form needles forming the channel discharge regions of the ink channels are left uncovered by the parting layer and by the envelope layer and in that the end region of the parting layer is completely covered with the envelope layer.

6. A method according to claim 1, wherein the tips of the form needles forming the channel discharge regions of the ink channels are left uncovered by the parting layer and by the envelope layer and wherein the tips of the form needles are coated with a second parting layer that covers the end region of the envelope layer.

* * * * *